United States Patent [19]

Reid et al.

[11] Patent Number: 4,967,300

[45] Date of Patent: Oct. 30, 1990

[54] MAGNETIC HEAD ASSEMBLY HAVING A TRANSVERSE GUIDING SURFACE FORMED OF A MIXTURE OF ALUMINUM OXIDE AND TITANIUM CARBIDE

[75] Inventors: James Reid, Santa Ynez; Gary E. Roberts, Santa Barbara; Paul D. Frank, Goleta, all of Calif.

[73] Assignee: Applied Magnetics Corporation, Goleta, Calif.

[21] Appl. No.: 542,052

[22] Filed: Oct. 14, 1983

[51] Int. Cl.$^5$ .................. G11B 5/187; G11B 5/127
[52] U.S. Cl. .................... 360/122; 360/110; 360/121
[58] Field of Search ............ 29/603; 360/119, 120, 360/121, 122, 110, 113, 126, 127

[56] References Cited

U.S. PATENT DOCUMENTS

| | | | |
|---|---|---|---|
| 4,001,890 | 1/1977 | Kayser | 360/113 |
| 4,044,392 | 8/1977 | Brock et al. | |
| 4,143,458 | 3/1979 | Gibson | |
| 4,251,841 | 2/1981 | Jacobs | 360/103 |
| 4,370,801 | 2/1983 | Roscamp et al. | |
| 4,370,802 | 2/1983 | Platter et al. | |
| 4,422,117 | 12/1983 | Nomura et al. | 360/122 |
| 4,430,440 | 2/1984 | Wada et al. | 501/105 |
| 4,438,212 | 3/1984 | Furukawa et al. | 501/92 |
| 4,516,179 | 5/1985 | Imakoshi et al. | 360/113 |
| 4,549,238 | 10/1985 | Ertinghausen et al. | 360/110 |
| 4,745,509 | 5/1989 | Watanabe et al. | 360/127 |

FOREIGN PATENT DOCUMENTS

| | | | |
|---|---|---|---|
| 53-20917 | 2/1978 | Japan | 360/122 |
| 57-113410 | 7/1982 | Japan | 360/122 |

OTHER PUBLICATIONS

Faure et al., Multitrack Magnetic Head Assembly, IBM Technical Disclosure Bulletin, vol. 11, No. 3, Aug. 1968, p. 344.

Watrous, Magnetic Head Suspension Assembly, IBM Technical Disclosure Bulletin, vol. 24, No. 10, Mar. 1982, p. 4915.

Primary Examiner—John H. Wolff

[57] ABSTRACT

A magnetic head assembly having a transverse guiding surface which is highly resistant to being abraded by a recording medium for reading and recording magnetically recorded information on the recording medium including a transducer having a transducing element on one end thereof and conductive leads extending from a different end thereof, a substrate formed of a mixture of Aluminum Oxide and Titanium Carbide ("$Al_2O_3$—TiC") having a medium contacting surface and a supporting surface extending substantially perpendicular therefrom wherein the substrate has the transducer rigidly affixed to the substrate supporting surface with the transducing element positioned adjacent the substrate contacting surface, a spacer formed of $Al_2O_3$—TiC having a medium contacting surface which is rigidly affixed in an opposed, spaced relationship to the substrate supporting surface with the transducer located therebetween forming a transducing assembly having the transducing element positioned between the substrate medium contacting surface and the spacer medium contacting surface to define a transverse guiding surface adapted to be contacted by a recording medium traversing along a path which is substantially parallel to and in contact with the transverse guiding surface, and a flexible electrical circuit electrically connected to the conductive leads of the transducer for conducting electrical signals representative of the magnetically recorded information on the recording medium is shown.

15 Claims, 3 Drawing Sheets

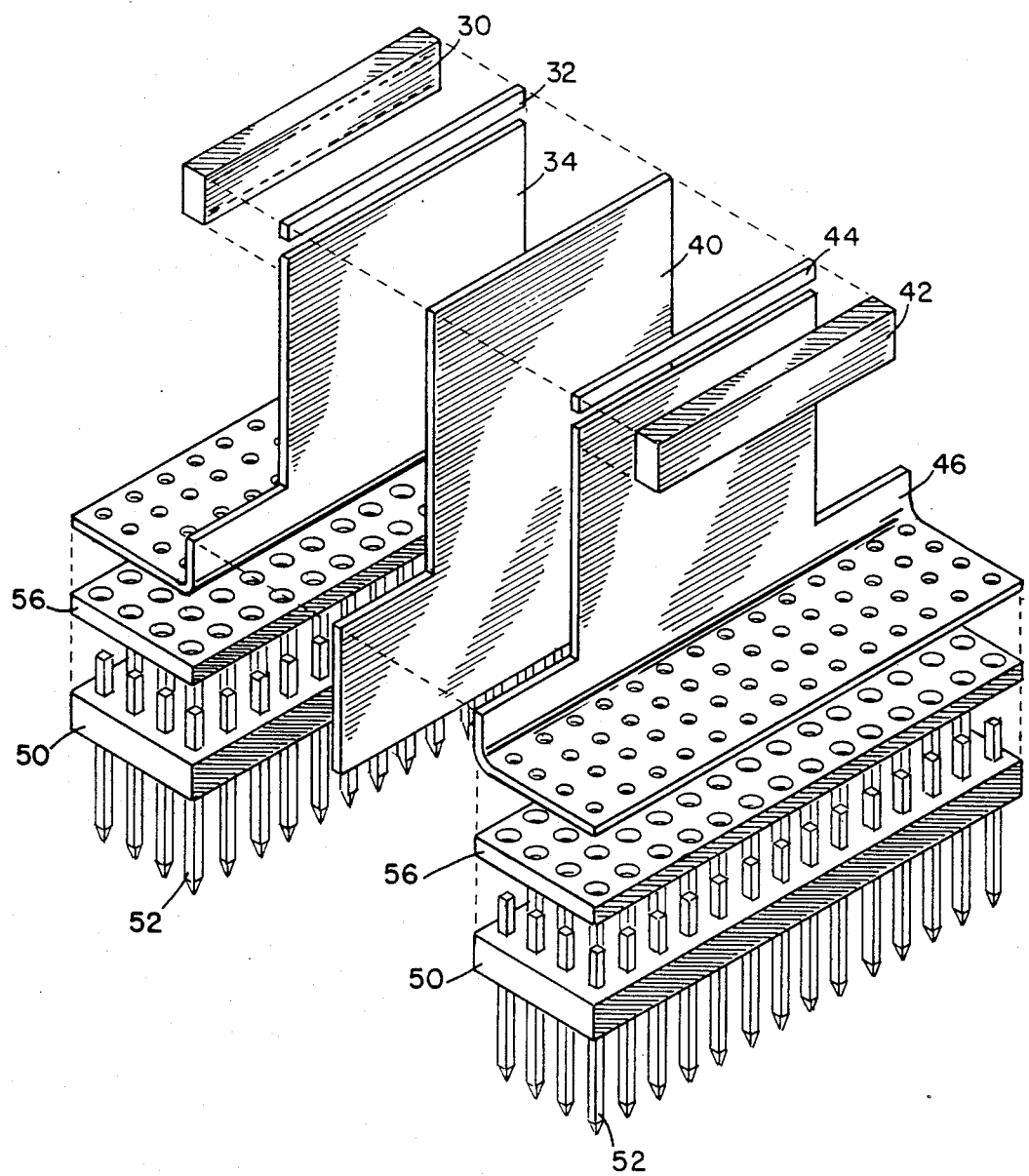
Fig_6

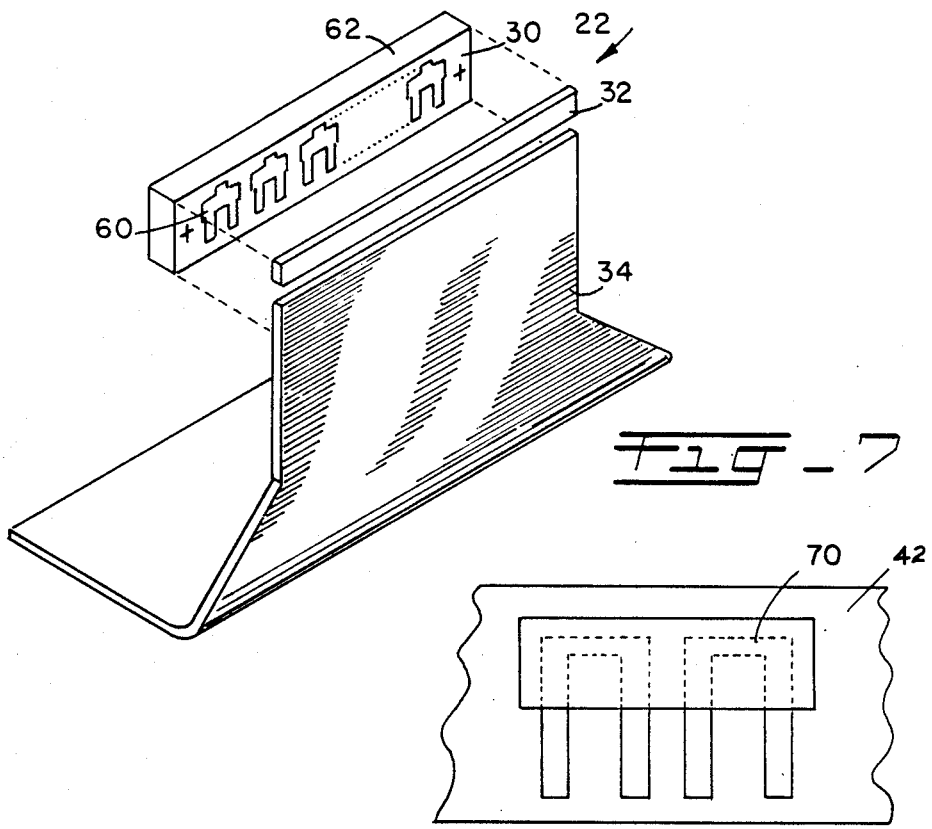
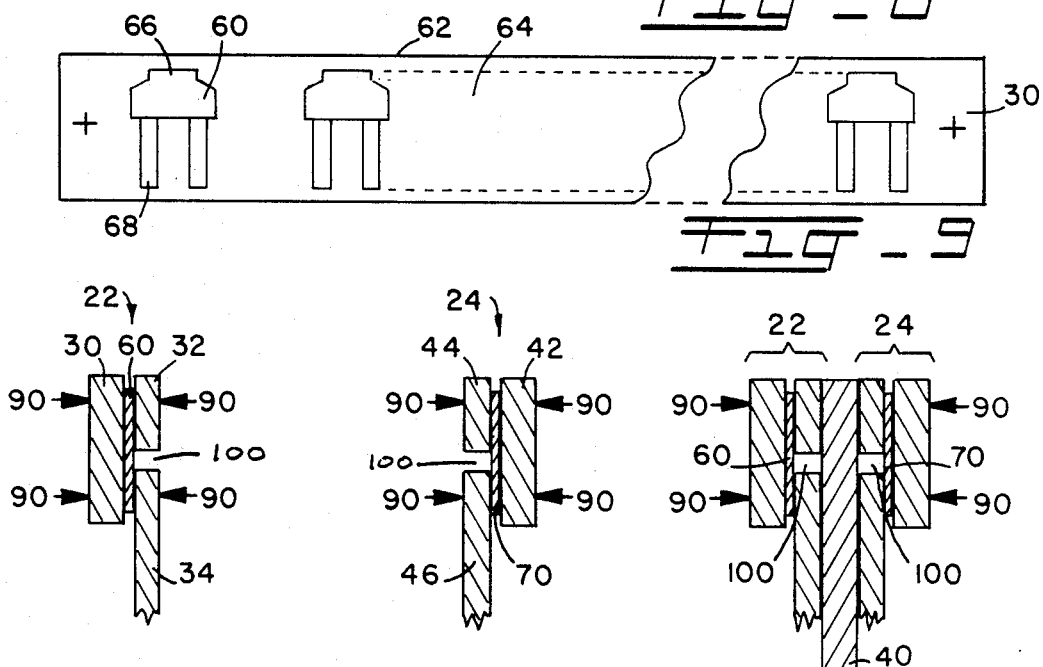

MAGNETIC HEAD ASSEMBLY HAVING A TRANSVERSE GUIDING SURFACE FORMED OF A MIXTURE OF ALUMINUM OXIDE AND TITANIUM CARBIDE

BACKGROUND OF THE INVENTION

1. Field of the Invention

This invention relates to a multi-track magnetic head assembly having a transverse guiding surface which is highly resistant to being abraded by a recording medium for reading and recording magnetically information on the recording medium and more particularly to a magnetic head assembly having a substrate and spacer medium contacting surface formed of $Al_2O_3$—TiC to define a transverse guiding surface adapted to be contacted by a recording medium transversing along a path which is substantially parallel to and in contact with the transverse guiding surface.

2. Description of the Prior Art

The use of thin film transducers as part of a transducing head assembly and the method of fabricating the same are well known in the art. One method of fabricating a thin film magnetic head assembly having glass bonded thin film transducers is disclosed in U.S. Pat. No. 4,143,458 entitled Method Of Making a Thin Film Magnetic Head Assembly by George W. Gibson assigned to the assignee of the present application.

A magnetic assembly having glass bonded thin film transducers is disclosed in U.S. Pat. No. 4,191,983 entitled Thin Film Magnetic Head Assembly Having A Thin Film Magnetic Transducer Encapsulated In Insulation Bonding Material by George W. Gibson assigned to the assignee of the present application.

Typically magnetic head assemblies formed of thin film magnetic transducers are utilized in apparatus for recording and reproducing information onto and from a magnetic medium. The magnetic recording and reproducing apparatus may be a magnetic disc or magnetic tape. In magnetic disc recording and reproducing apparatus, the magnetic disc is rotated relative to the magnetic head assembly at a constant speed. Typically, the reading and recording of information onto and from the rotating magnetic medium is accomplished by using inductive thin film magnetic transducers as the transducers forming the magnetic head assembly. In certain of the magnetic disc apparatus, the magnetic head assembly includes a slider which enables the magnetic head assembly to fly on a thin film air bearing. The thin film air bearing provides non-contact magnetic transducing acting between the magnetic head assembly, which may contain one or more magnetic transducing heads, and the rotating magnetic medium.

In magnetic tape recording and reproducing apparatus, the magnetic head assembly is oriented relative to the magnetic tape such that the magnetic tape is in contact with and is transported across the magnetic tape head assembly. During operation, the magnetic tape is transported across and contacts the magnetic head assembly resulting in the magnetic tape abrading the medium contacting surface of the magnetic head assembly. This has the attended effect of wearing both the magnetic tape and magnetic head assembly, which directly determine both tape life and head life.

One known process for fabricating a read-while-write magnetic tape head assembly using an inductive write transducer and a magnetoresistive read transducer is disclosed in U.S. Pat. No. 4,044,392. In the method disclosed in U.S. Pat. No. 4,044,392, the active read and write elements are deposited on ferrite half-yokes attached to titanium or baria titania ceramic end pieces. A center section, formed of a sandwich of silver-copper shielding material between two ferrite sheets having glass filled slots, is placed between the read and write transducers with the write windings between pairs of the glass filled slots. The magnetoresistive elements are positioned in contact with the opposite surface of the center shield. The glass filled slots on each side of the write elements define the track edge. The titanium or the baria titania ceramic end pieces, having the inductive elements and magnetoresistive elements formed thereon, are assembled with the center section therebetween and joined together in a manner such that a vise-like action holds the magnetic tape head assembly together.

It is also known in the art to mount a magnetic disc head assembly onto magnetic head sliders to form a magnetic head slider assembly. Typically, magnetic head slider assemblies are utilized to fly the magnetic head assembly supported thereby on an air bearing relative to a rotating magnetic disc. With the advent of thin film magnetic transducers, the physical size of the transducing element is extremely small. This has necessitated a reduction in size of the slider elements which, in turn, has caused an increase in the difficulty of fabricating the smaller slider elements. As a result thereof, new compositions of material have been developed which are resistent to breakage, have improved machining properties and good wear characteristics. One such magnetic head slider assembly is disclosed in U.S. Pat. No. 4,251,841 wherein the slider element is formed of a mixture of Aluminum Oxide ($Al_2O_3$) and Titanium Carbide (TiC) in certain ratios and of compositions having certain grain sizes, all as disclosed in the U.S. Pat. No. 4,251,841.

SUMMARY OF THE INVENTION

This invention relates to a new, novel and unique magnetic head assembly which includes a transducing head subassembly having a transverse guiding surface which is highly resistant to being abraded by a recording medium for reading and recording magnetically recorded information on the recording medium. The transducing head sub-assembly includes a transducer having a transducing element on one end thereof and conductive leads extending from a different end thereof. A substrate formed of a mixture of $Al_2O_3$—TiC has a medium contacting surface and a supporting surface extending substantially perpendicular therefrom. The substrate has the transducer rigidly affixed to the substrate support surface with the transducing element positioned adjacent the substrate contacting surface. A spacer formed of a mixture of $Al_2O_3$—TiC having a medium contacting surface is rigidly affixed in an opposed, spaced relationship to the substrate supporting surface with the transducer located therebetween forming a transducing sub-assembly having the transducing element positioned between the substrate medium contacting surface and the spacer medium contacting surface to define a transverse guiding surface. The transverse guiding surface is adapted to be contacted by a recording medium traversing along a path which is substantially parallel to and in contact with the transverse guiding surface. A conductive means is electrically connected to the conductive leads of the transducer for conducting electrical signals representative of the magnetically recorded information on a the recording medium.

The known prior art methods for manufacturing a magnetic head assembly having an inductive transducer as the write element and a magnetoresistive transducer as the read element utilizes a sandwich constructed center section which include pairs of glass filled slots as a means for providing a shield between the inductive elements. The half yoke end pieces having the transducer elements mounted thereon are assembled and held together by means of a vise-type clamping force applied thereto by bolts, with the center shield therebetween. The medium contacting surface of the so formed magnetic head assembly comprises the ferrite or titanium end blocks, ferrite spacers and the center section having the glass filled slots.

Each of the sub-assemblies, together with the sandwich center section, are then formed into an assembly having a low viscosity epoxy applied thereto and are held together by fasteners. This known manufacturing process, and the product produced thereby, is a multi-step process requiring a specially fabricated center section having glass slots which function to define the write tracks. Also, the materials which contact the recording medium have a wear characteristic which is similar to the state-of-the-art magnetic tape head assemblies.

The present invention overcomes the disadvantages of the known prior art head assemblies by providing transducers sub-assemblies having a transverse guiding surface formed of a mixture of $Al_2O_3$—TiC which is highly resistant to being abraded by a recording medium and which is adapted to be contacted by a recording medium traversing along a path which is substantially parallel to and in contact with the transverse guiding surface.

Another advantage of the magnetic head assembly is that a magnetic head can be assembled from transducing subassemblies having a feed-through shield incorporated therein to insure that each of the transducing element are shielded from each other during the read-while-write operations.

Still another advantage of the present invention is that the transducing element is supported on each side by a substrate and a spacer both of which are formed of a mixture of $Al_2O_3$—TiC which define a transverse medium contacting surface which is highly resistant to being abraded by a recording medium contacting the same as the recording medium is transported along a path which is substantially parallel to and in contact with the transverse guiding surface.

A still yet another advantage of the present invention is that the feed-through shield may be formed of a material which wears faster than that of the high wear characteristics of the substrate and spacers resulting in a magnetic tape head assembly having a medium contacting surface having differential wear characteristics thereby insuring that the substrate and spacers which support the transducing element have intimate head-to-tape contact.

A still yet further advantage of the present invention is that substrate and superstrate are formed of a mixture of $Al_2O_3$—TiC, a highly resistant material, which results in an improved head wear characteristic without degrading tape life.

A still yet further advantage of the present invention is that higher tape speeds and higher recording densities are possible using the magnetic tape head disclosed herein.

BRIEF DESCRIPTION OF THE DRAWING

The foregoing and other advantages and features of this invention will become apparent from the following description of the preferred embodiment, when considered together with the illustrations and accompanying drawing which includes the following Figures:

FIG. 6 is an exploded perspective view of two transducer sub-assemblies and feed-through shield which is assembled using the method of the present invention;

FIG. 7 is an exploded perspective view of a write transducing sub-assembly utilizing inductive thin film transducers formed using the teaching of this invention;

FIG. 8 is a pictoral representation of the substrate having magnetoresistive thin film transducers;

FIG. 9 is a front plan view of a substrate having a plurality of inductive thin film transducers mounted thereon; and FIGS. 10, 11 and 12 illustrate by cross-sectional views the various steps of the method of the present invention.

DESCRIPTION OF THE PREFERRED EMBODIMENT

Figure 1:
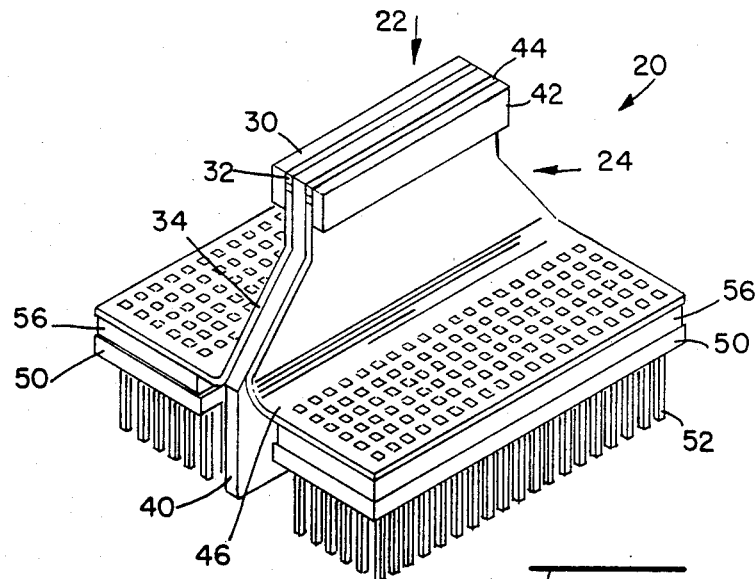
FIG. 1 is a perspective view of a magnetic tape head assembly produced by the method of the present invention.

In FIG. 1 a multi-track read-while-write magnetic tape head assembly, shown generally as 20, adapted for use with a recording medium has a write transducing sub-assembly 22 comprising a first substrate 30, first spacer 32 and an electrical circuit means 34. The first substrate 30 is formed of a material which is highly resistant to being abraded by a medium being transported thereacross. The first substrate 30 has a medium contacting surface and a supporting surface which is substantially perpendicular to the medium contacting surface. The first substrate 30 supports a transducer having a transducing element located on one side and leads located on a different side. The transducing element is located adjacent the medium contacting surface and with the leads extending along the supporting surface away from the medium contacting surface. The construction of a substrate with thin film transducers is shown in detail in FIG. 9 and the construction of a substrate with magnetoresistive thin film transducers is shown in FIG. 8.

A first spacer 32 is formed of a material which is highly resistant to being abraded by a medium and having a medium contacting surface of a preselected width spaced and sidewalls extending substantially perpendicular therefrom. The first spacer 32 is positioned such that one of the sidewalls is adjacent the substrate supporting surface and contiguous the transducer with the transducing gap located therebetween.

An electrical circuit means 34 terminates in an edge having a width which is substantially equal to the preselected width of the first spacer 32. The electrical circuit means 34 has spaced, opposed outer surfaces which extend substantially perpendicular from the edge and one of the sidewalls thereof has exposed conductors. The sidewall of the electrical circuit means 34 is positioned to the supporting surface of the first substrate 30 wherein the exposed conductors make intimate electrical contact with said leads of the transducer. The electrical circuit means 34 has its edge spaced from the first spacer 32 and from the transducing element.

A read transducer sub-assembly 24 includes a second substrate 42 having a transducer which, in the preferred embodiment, is a magnetoresistive thin film transducer, mounted thereon. The second substrate 42 is formed of the same material as the first substrate 30. The read transducing sub-assembly 24 further includes a second spacer 44 and a second electrical circuit means 46. The construction of these elements are the same as those of the write transducing sub-assembly 22. The electrical circuit means illustrated in FIG. 1 is included in the description of FIGS. 2 to 4, inclusive.

Figure 2:
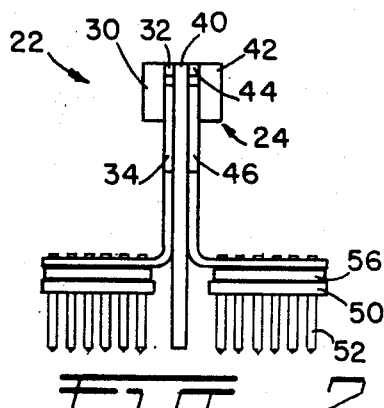
FIG. 2 is a left side plan view of the magnetic tape head assembly of FIG. 1.
Figure 3:
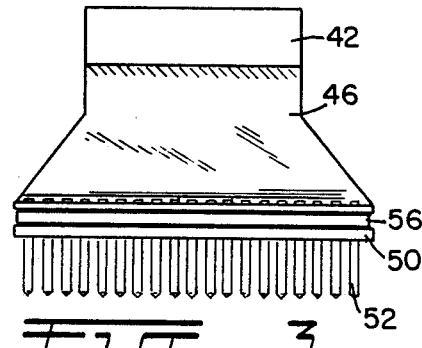
FIG. 3 is a front plan view of the magnetic tape head assembly of 1.
Figure 4:
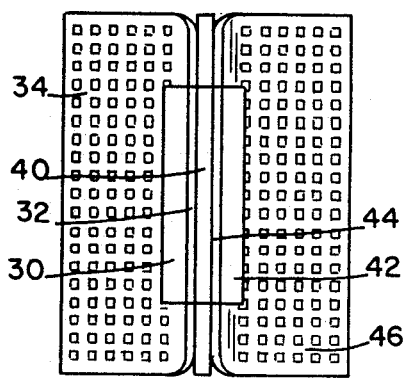
FIG. 4 is a top plan view of the magnetic tape head assembly of FIG. 1.
Figure 5:
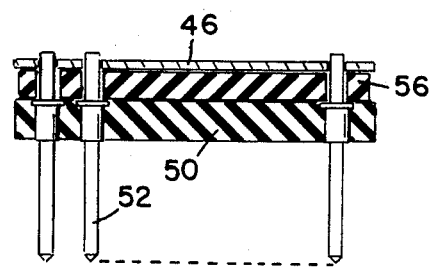
FIG. 5 is an exploded partial plan view of the flexible electrical conductors affixed to the pins of the electrical connector.

FIGS. 2, 3 and 4 show the assembled read-while-write magnetic tape head assembly 20. As illustrated in FIG. 2, the read-while-write magnetic tape head assembly 20 includes the write transducing sub-assembly 22 and the read transducing sub-assembly 24. FIG. 1 to 4, inclusive, show that the electrical circuit means 34 and the second electrical circuit means 46 are each adapted to be electrically connected to electrical connector pins 52 which are supported and held in position by electrical pin supporting web 50. An electrical connector spacer 56 is located between the electrical circuit means 34 and the second electrical circuit means 46 of each transducer sub-assembly and the electrical pin supporting web 50.

In the preferred embodiment, the write transducing sub-assembly 22 and read transducing sub-assembly 24 may comprise a plurality of thin film transducing elements to form a nine track magnetic tape head assembly. However, it is envisioned that the transducing sub-assemblies may comprise any number of transducers which may be in multiples of nine such as for example, eighteen thin film transducers transducers to form an eighteen track read-while-write magnetic tape head assembly. In a typical nine track magnetic tape head assembly, the write track width is typically in the order of 44 mils and the read track width is typically in the order of 40 mils with a center spacing of about 55 mils.

In one embodiment of the multi-track read-while-write magnetic head tape assembly 20 shown in FIGS. 1 to 5, inclusive, tape speeds in the order of 100 inches per second (ips) were utilized with tape tension in the order of 8 ounces and with a tape wrap angle of about 9.5° or about 4.5° on each side. The magnetic tape had a width of about ½ inch, and was a 3M Brand type 777 tape. The first substrate 30, the second substrate 42, the first spacer 32 and the second spacer 44 were formed of a mixture of Aluminum Oxide and Titanium Carbide ($Al_2O_3$—TiC).

One mixture of Aluminum Oxide and Titanium Carbide which may be used is a high density, fine grained, $Al_2O_3$—TiC composite compound offered for sale by the Technical Ceramic Products Division of 3M Company of St. Paul, Minn. under the Trademark "AlSiMag 204". In this embodiment, the magnetic tape head had a life in excess of 200 months.

FIG. 6 shows the details of the construction of the preferred embodiment of the product, a multi-track read-while-write magnetic tape head assembly 20, produced by the process of this invention. In the preferred embodiment, the write transducing sub-assembly 22 includes the first substrate 30 which has eighteen inductive thin film transducers deposited thereon using known state-of-the-art techniques. The first spacer 32 and the second spacer 44 are selected to be formed of a material which is highly resistant to being abraded by a medium being placed in contact therewith and transported thereacross. The width of the first spacer 32 and the second spacer 44 are predetermined and may be in the order of 5 mils. The electrical circuit means 34 and the second electrical circuit means 46 are likewise selected t have a predetermined width which is substantially the same as that of the first spacer 32 and second spacer 44, respectively. In one embodiment of the multi-track read-while-write magnetic head tape assembly 20, the spacing between the lower edges of the first spacer 32 and the second spacer 44 and its respective electrical circuit means 34 and second electrical circuit means 46 were in the order of about 5 mils.

In the preferred embodiment, the electrical circuit means 34 and second electrical circuit means 46 were flexible electrical circuits having a web formed of insulating material and electrical conductors which are well known in the state of the art. The flexible electric circuit include electrical terminals having a cross-sectional area which is precisely positioned on the flexible electrical circuit web at the end thereof. The electrical terminals are capable of being pierced by the electrical connector pins 52. The electrical connector pins 52 are electrically connected to the electrical terminal by soldering.

Referring to FIG. 6, the feed-through shield 40 is formed of a magnetic material having high permeability and good wear characteristics. The feed-through shield 40 will wear at a slightly higher rate than the first substrate 30, the second substrate 42, the first spacer 32 and the second spacer 44 resulting in a differential wearing surface. The feed-through shield 40 essentially shields the magnetoresistive thin film transducers affixed to the second substrate 42 from inductive and capacitive coupling effects of the inductive thin film transducers affixed to first substrate 30.

FIGS. 10, 11 and 12 illustrate the steps of the method of forming the multi-track read-while-write magnetic tape head assembly 20. In the preferred embodiment, the write transducing sub-assembly 22 is formed in one sub-process and the read transducing sub-assembly 24 is formed by a second sub-process. Thereupon the write transducing sub-assembly 22 and the read transducing sub-assembly 24 are assembled with the feed-through shield 40 therebetween t form the multi-track read-while-write magnetic tape head assembly 20. The first electrical circuit means 34 and the second electrical circuit means 46 are then connected to the electrical connector pins 52 supported by electrical pin supporting web 50.

In the preferred embodiment, a method of manufacturing either of the transducing head sub-assemblies for a multi-track read-while-write magnetic head assembly adapted for use with a recording medium comprises the steps of:

(1) affixing a substrate, formed of a material which is highly resistant to being abraded by a medium being transported thereacross and having a medium contacting surface and a supporting surface which is substantially perpendicular to the medium contacting surface, to a transducer having a transducing element located on one side and leads located on a different side with the transducing element located adjacent the medium contacting surface and with the leads extending along the supporting surface away from the medium contacting surface;

(2) bonding a spacer, formed of a material which is highly resistant to being abraded by a medium and having a medium contacting surface of a preselected width having spaced sidewalls extending substantially perpendicular therefrom, with one of the sidewalls adjacent the substrate supporting surface and contiguous the transducer with the transducing element located therebetween;

(3) bonding and heating an electrical circuit means, which terminates in an edge having a width which does not exceed the preselected width, with spaced, opposed outer surfaces which extend substantially perpendicular from the edge with one of the sidewalls having exposed conductors, to the supporting surface of the spacer wherein solder coated conductors are heated to a temperature wherein the electrical conductors are soldered to the leads of the transducer, the electrical circuit means having its edge spaced from the first spacer and from the transducer; and (4) Applying a clamping force to the transducing sub-assembly during the bonding steps.

The above method can include the steps of bonding a first transducing sub-assembly and a second transducing sub-assembly produced with the above process to a feed-through shield 40 and then bonding the feed-through shield 40 with the above applying of a clamping force to form the multi-track read-while-write magnetic head tape assembly 20.

In the alternative, the step of heating in step 3 is desirable in the preferred embodiment to cause the solder coated conductors to be soldered to the leads of the transducer. If only exposed conductors are used, which is an alternative, the step of heating is used and the exposed conductors make intimate contact with the leads of the transducer. The temperature for heating and soldering would be in the order of about 230° C. to 240° C. to flow the solder. The temperature to cure the epoxy depends on the epoxy and would typically be at a lower temperature than that required for soldering.

The heating step of the process utilizes temperatures in the order of 230° C. to 240° C. for the solder flow. The transducing sub-assembly is held at the solder flow temperature for the time required to flow the solder. In certain applications, it may be necessary to apply a magnetic field for preserving the magnetic properties of the magnetic film within the transducer.

After the multi-track read-while-write magnetic tape head assembly 20 is fabricated using the above process, the step of forming a contour on the magnetic head assembly by lapping and polishing the medium contacting surface of the so formed multi-track read-while-write magnetic tape head assembly 20 into the desired shape is performed.

The step of attaching electrical connection pins to the electrical conducting means and the soldering of the electrical connection pins to the electrical conducting means can be preformed after the magnetic head assembly is completed.

As illustrated in FIG. 10, a transducing sub-assembly is formed of the first substrate 30, the inductive thin film transducers 60, the first spacer 32 and electrical circuit means 34. The first spacer 32 has the inductive thin film transducers 60 affixed thereto by deposition using known deposition processes. The first substrate 30 has the inductive thin film transducers 60 bonded to the first spacer 32 and to the solder coated electrical conductors of the electrical circuit means 34 as shown in FIG. 10. A low viscosity epoxy, cement or other appropriate adhesive is applied to the components of the sub-assembly while the entire sub-assembly is clamped under pressure as shown by arrows 90 depicting a clamping force. Preferably, the entire sub-assembly is then heated to the required temperature to cause the solder to flow. The low viscosity epoxy (or appropriate adhesive) is drawn into the voids and spaces therebetween and sets to provide the bonding action. The solder on the solder coated electrical conductors of the circuit means will flow and bond to the leads of the transducer. The first substrate 30 is positioned with its medium contacting surface 62 adjacent the medium contacting surface of the first spacer 32. The inductive thin film transducers 60 are positioned in the transducing sub-assembly with the transducing element 66 located between the supporting surface 64 and the first spacer 32. The edge of the electrical circuit means 34 is spaced from the edge of the first spacer 32 as shown in FIG. 10 by opening 100.

FIG. 11 shows the read transducing sub-assembly 24 which is formed of the second substrate 42, the magnetoresistive thin film transducers 70, the second spacer 44 and the second electrical circuit means 46. The read transducing sub-assembly 24 is assembled using the above described process and is held in place during the epoxy curing process by a clamping force shown by arrows 90.

FIG. 12 shows the step of bonding the write transducing sub-assembly 22, the feed-through shield 40 and the read transducing sub-assembly 24 into a multi-track read-while-write magnetic head assembly 20. A low viscosity epoxy is used as the bonding agent and the entire assembly is subject to a clamping force shown by arrows 90.

In the preferred embodiment, a multi-track read-while-write magnetic tape head assembly 20 adapted for use with magnetic tape media, can be fabricated by using the process described In its broadest concept, the electrical current means may include electrical conductors extending from the electrical connection pins to an external current.

What is claimed is:

1. A transducer head sub-assembly having a transverse guiding surface which is highly resistant to being abraded by a recording medium for reading and recording magnetically recorded information on the recording medium comprising a transducer having a transducing element at one end thereof and conductive leads of a known length extending therefrom at a different location than said one end;

a substrate formed of a mixture of sintered $Al_2O_3$—TiC having a medium contacting surface and a support surface extending substantially perpendicular therefrom, said substrate having said transducer rigidly affixed to said substrate supporting surface with the transducing element positioned adjacent said medium substrate contacting surface; and a spacer formed of a mixture of sintered $Al_2O_3$—TiC having substantially the same abrading characteristics as said substrate when contacted by a medium, said spacer having a medium contacting surface of a predetermined width and sidewalls extending substantially perpendicular therefrom a distance less than the known length of the conductive leads of the transducer, said spacer being rigidly affixed in an opposed, spaced relationship to said substrate supporting surface with said transducer located therebetween with the conductive leads of the transducer extending beyond the sidewalls forming a transducing head sub-assembly having said transducing element positioned between said substrate medium contacting surface and said spacer medium contacting surface to define a transverse guiding surface having substantially the same abrading characteristics thereacross adapted to be contacted by a recording medium transversing along a path which is substantially parallel to and in contact with said transverse guiding surface.

2. The transducing head sub-assembly of claim 1 further comprising
electrical circuit means having a width which is equal to or less than said predetermined width electrically connected to said conductive leads of said transducer and being adapted to conduct electrical signals representative of the magnetically recorded information on a said recording medium.

3. The transducing head sub-assembly of claim 2 wherein the transducer, the substrate and the spacer are bonded together with a low viscosity epoxy that bonds at a temperature that does not effect the magnetic properties of the transducer.

4. The transducing head sub-assembly of claim 2 further comprising
electrical connecting pins electrically connected to said electrical circuit means.

5. The transducing head sub-assembly of claim 4 wherein the electrical connecting pins are soldered to said electrical circuit means.

6. A read-while-write magnetic head sub-assembly having a transverse guiding surface which is highly resistant to being abraded by a recording medium or reading and recording magnetically recorded information on the recording medium comprising
a first and second transducing head sub-assembly wherein each transducing head sub-assembly includes
a transducer having a transducing element at one side thereof and conductive leads of a known length extending therefrom at a different location than said one end;
a substrate formed of a mixture of sintered $Al_2O_3$—TiC having a medium contacting surface and a support surface extending substantially perpendicular therefrom, said substrate having said transducer rigidly affixed to said substrate supporting surface with the transducing element positioned adjacent said substrate medium contacting surface; and
a spacer formed of a mixture of sintered $Al_2O_3$—TiC having substantially the same abrading characteristics as said substrate when contacted by a medium, said spacer having a medium contacting surface of a predetermined width and sidewalls extending substantially perpendicular therefrom a distance less than the known length of the conductive leads of the transducer, said spacer being rigidly affixed in an opposed, spaced relationship to said substrate supporting surface with said transducer located therebetween with the conductive leads of the transducer extending beyond the sidewalls forming a transducing head sub-assembly having said transducing element positioned between said substrate medium contacting surface and said spacer medium contacting surface to define a transverse guiding surface having substantially the same abrading characteristics thereacross adapted to be contacted by a recording medium transversing along a path which is substantially parallel to and in contact with said transverse guiding surface.

7. The magnetic head assembly of claim 6 further comprising
electrical circuit means having a width which is equal to or less than said predetermined width electrically connected to said conductive leads of each of said transducing head sub-assembly and being adapted to conduct electrical signals representative of the magnetically recorded information on a said medium.

8. The magnetic head assembly of claim 7 further comprising
a feed-through shield interposed between the first transducing head sub-assembly and the second transducing sub-assembly.

9. A read-while-write magnetic head sub-assembly having a first transducing head sub-assembly and a second transducing head sub-assembly and a transverse guiding surface which is highly resistant to being abraded by a recording medium for reading and recording magnetically recorded information on a medium comprising, said magnetic head assembly comprising
a first and second substrate formed of sintered $Al_2O_3$—TiC having a medium contacting surface and a supporting surface extending substantially perpendicular therefrom, said first and second substrate having each having a transducer having conductive leads of a known length extending therefrom rigidly affixed to the supporting surface thereof; and
a first and second spacer formed of sintered $Al_2O_3$—TiC having a medium contacting surface and having substantially the same abrading characteristics as said substrates when contacted by a medium, said spacers having a medium contacting surface of a predetermined width and sidewalls extending substantially perpendicular therefrom a distance less than the known length of the conductive leads of the transducer, said spacers being rigidly affixed in an opposed, spaced relationship to said supporting surface with said transducer located therebetween with the conductive leads of the transducer extending beyond the sidewalls forming a first and second transducing head sub-assembly having said transducing element positioned between said substrate medium and its respective substrate medium contacting surface and said spacer medium contacting surface to define a transverse guiding surface having substantially the same abrading characteristics thereacross adapted to be contacted by a medium transversing along a path which is substantially parallel to and in contact with said transverse guiding surface.

10. The read-while-write magnetic head substrate assembly of claim 9 further comprising a feed-through shield interposed between the first transducer head sub-assembly and the second transducer head sub-assembly.

11. A transducer head sub-assembly having a transverse guiding surface which is highly resistant to being abraded by a recording medium for reading and recording magnetically recorded information on the recording medium comprising a transducer having a transducing element at one end thereof and conductive leads extending therefrom at a different location than said one end;

a substrate formed of a mixture of sintered $Al_2O_3$—TiC having a medium contacting surface and a support surface extending substantially perpendicular therefrom, said substrate having said transducer rigidly affixed to said substrate supporting surface with the transducing element positioned adjacent said substrate contacting surface; and a spacer formed of a mixture of sintered $Al_2O_3$—TiC having a medium contacting surface and substantially the same abrading characteristics as said substrate when contacted by a medium, said spacer being rigidly affixed in an opposed, spaced relationship to said substrate supporting surface with said transducer located therebetween forming a transducer head sub-assembly having said transducing element positioned between said substrate medium contacting surface and said spacer medium contacting surface to define a transverse guiding surface having substantially the same abrading characteristics thereacross adapted to be contacted by a recording medium transversing along a path which is substantially parallel to and in contact with said transverse guiding surface, said transducer, substrate and spacer being bonded together with a low viscosity epoxy that bonds at a temperature that does not affect the magnetic properties of the transducer; and electrical circuit means electrically connected to said conductive leads of said transducer and being adapted to conduct electrical signals representative of the magnetically recorded information on a said recording medium.

12. The transducing head sub-assembly of claim 11 further comprising electrical connecting pins electrically connected to said electrical circuit means.

13. The transducing head sub-assembly of claim 12 wherein the electrical connecting pins are soldered to said electrical circuit means.

14. A read-while-write magnetic head sub-assembly having a transverse guiding surface which is highly resistant to being abraded by a recording medium for reading and recording magnetically recorded information on the recording medium comprising a first and second transducer head sub-assembly wherein each transducing head sub-assembly includes a transducer having a transducing element at one side thereof and conductive leads extending therefrom at a different location than said one end;

a substrate formed of a mixture of sintered $Al_2O_3$—TiC having a medium contacting surface and a supporting surface extending substantially perpendicular therefrom, said substrate having said transducer rigidly affixed to said substrate supporting surface with the transducer element positioned adjacent said substrate contacting surface; and a spacer formed of sintered $Al_2O_3$—TiC having a medium contacting surface and having substantially the same abrading characteristics as said substrates when contacted by a medium, said spacer being rigidly affixed in an opposed, spaced relationship to said substrate supporting surface with said transducer located therebetween forming a transducing head sub-assembly having said transducing element positioned between said substrate medium contacting surface and said spacer medium contacting surface to define a transverse guiding surface having substantially the same abrading characteristics thereacross adapted to be contacted by a recording medium transversing along a path which is substantially parallel to and in contact with said transverse guiding surface;

a feed-through shield interposed between the first transducing head sub-assembly and the second transducing sub-assembly; and electrical circuit means electrically connected to said conductive leads of each of said transducing head sub-assembly and being adapted to conduct electrical signals representative of the magnetically recorded information on a said medium.

15. A read-while-write magnetic head sub-assembly having a first transducing head sub-assembly and a second transducing head sub-assembly and a transverse guiding surface which is highly resistant to being abraded by a recording medium for reading and recording magnetically recorded information on a medium comprising, said magnetic head assembly comprising a first and second substrate formed of sintered $Al_2O_3$—TiC having a medium contacting surface and a supporting surface extending substantially perpendicular therefrom, said first and second substrate having each having a transducer rigidly affixed to the supporting surface thereof; and a first and second spacer formed of sintered $Al_2O_3$—TiC having a medium contacting surface and having substantially the same abrading characteristics as said substrates when contacted by a medium, said spacer being rigidly affixed in an opposed, spaced relationship to said supporting surface with said transducer located therebetween forming a first and second transducing head sub-assembly having said transducing element positioned between said substrate medium and its respective substrate medium contacting surface and said spacer medium contacting surface to define a transverse guiding surface having substantially the same abrading characteristics thereacross adapted to be contacted by a medium transversing along a path which is substantially parallel to and in contact with said transverse guiding surface; and a feed-through shield interposed between the first transducing head sub-assembly and the second transducing sub-assembly.

* * * * *